C. BUSACK.
Revolving Harrow.

No. 200,127. Patented Feb. 12, 1878.

Witnesses:
L. U. Seely
R. N. Dyer

Inventor:
Christian Busack
by Geo. W. Dyer
Atty.

UNITED STATES PATENT OFFICE.

CHRISTIAN BUSACK, OF LANSING, ILLINOIS.

IMPROVEMENT IN REVOLVING HARROWS.

Specification forming part of Letters Patent No. 200,127, dated February 12, 1878; application filed December 10, 1877.

*To all whom it may concern:*

Be it known that I, CHRISTIAN BUSACK, of Lansing, in the county of Cook and State of Illinois, have invented new and useful Improvements in Revolving Harrows, as fully set forth in the following specification.

The nature of my invention relates to harrows having two or more sections, which lie flat upon the ground, each section having an upright axis, by which it is pivoted to a frame, so that the sections will rotate while advancing over the ground.

My invention consists in a removable bolt for coupling the revolving sections of the harrow, so as to prevent them from rotating, by which arrangement this implement can be used either as a revolving or as a common rake-harrow.

Figure 1:
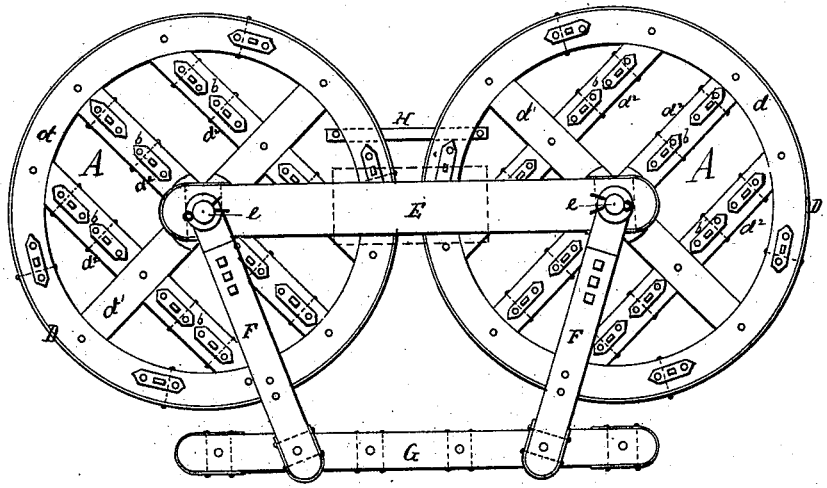
Figure 2:
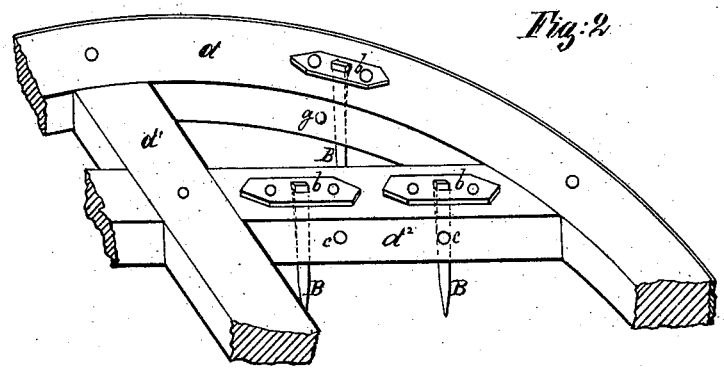
Figure 3:
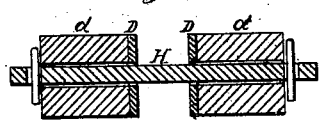
Figure 5:
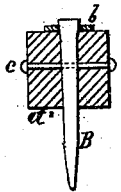
Figure 4:
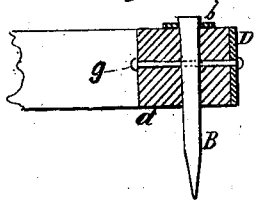

In the drawings, Figure 1 is a plan of the harrow. Fig. 2 is an enlarged perspective view of a portion of a harrow-section. Fig. 3 is a vertical longitudinal section through the center of the coupling-bolt. Fig. 4 is a vertical cross-section through the rim of one of the harrow-sections, and Fig. 5 is a similar section through one of the spike-carrying cross-beams.

A A are two wheels or harrow-sections, framed of timber, and consisting each of the rim $d$, main radial beam $d^1$, and of three cross-beams, $d^2$, through which are projected the spikes B. $b\ b$ are wrought-iron oblong plates, secured upon the beams and rim, each by two riveted bolts, and having each an oblong square hole at its center, which receive and hold the heads of the spikes B. Bolts $c$ are passed transversely through the beams $d^2$, in close proximity to the spikes B, and are riveted at their ends against the wood or an intermediate washer; and similar bolts $g$ are passed radially through the rim $d$ and band D, also in close proximity to the spikes B, and riveted at their ends. These rivets $c$ and $g$ are for the purpose of bracing the timbers against splitting or cracking by the insertion of the spikes or by shrinkage.

Both rotating sections A A have each an upright axis, $e$, which are pivoted into suitable boxes at the ends of a beam, E, which holds both sections at right distance apart. Two tug-bars, F, coupled to the axis of the harrow-sections, couple the same to the central portion of the drag-beam G, to which the horses are hitched.

H is a bolt passed through holes in the rims of both harrow-sections, and held therein either by pins entering eyes in the ends of said bolt or by screw-nuts. This bolt will couple both rims together, so that neither can rotate, and is intended to be applied when the harrow is used, after seeding, for covering the seeds. The spikes in each harrow-section are so placed, and the holes in the rims for the coupling-bolt are so located, that when said bolt is inserted the harrow-spikes will draw parallel furrows at equal distances apart.

For weeding or for preparing the ground previous to seeding, the coupling-pin is removed, when both harrow-sections will revolve in opposite directions, and will clear themselves of the weeds and roots.

What I claim as my invention is—

In combination with the revolving harrow-sections A A, the coupling-bolt H, inserted through their rims, substantially in the manner herein set forth, for the purpose specified.

CHRISTIAN BUSACK.

Witnesses:
WM. H. LOTZ,
EMIL H. FROMMANN.